US005122811A

United States Patent [19]

Maslanka et al.

[11] Patent Number: 5,122,811

[45] Date of Patent: Jun. 16, 1992

[54] METHOD AND APPARATUS FOR PRINTING WITH A REDUCED PRINT-CYCLE TIME

[75] Inventors: Daniel C. Maslanka, Rochester; Robert F. Mindler, Churchville, both of N.Y.

[73] Assignee: Eastman Kodak Company, Rochester, N.Y.

[21] Appl. No.: 664,001

[22] Filed: Mar. 4, 1991

[51] Int. Cl.[5] .................... G01D 15/28; G03G 21/00; B65H 5/02; B41J 11/48

[52] U.S. Cl. .................................... 346/1.1; 346/134; 346/136; 346/138; 355/308; 355/321; 271/277; 400/596

[58] Field of Search ................ 346/1.1, 134, 136, 138; 271/277; 355/308, 321; 400/596

[56] References Cited

U.S. PATENT DOCUMENTS

| | | | |
|---|---|---|---|
| 3,370,533 | 2/1968 | Westra et al. | 101/269 |
| 3,414,259 | 12/1968 | Koch et al. | 271/82 |
| 3,663,014 | 5/1972 | Wasylenko | 271/82 |
| 3,734,015 | 5/1973 | Camis et al. | 101/229 |
| 3,744,791 | 7/1973 | Bongers | 271/277 |
| 3,827,803 | 7/1974 | Shelffo et al. | 355/272 |
| 3,906,512 | 9/1985 | Farlow | 346/138 |
| 3,985,074 | 10/1976 | Bonsch | 101/410 |
| 4,033,575 | 7/1977 | Fujimoto | 271/3 |
| 4,063,724 | 12/1977 | Suda | 271/277 |
| 4,268,841 | 5/1981 | Fujii et al. | 346/138 |
| 4,326,792 | 4/1982 | Landa | 355/271 |
| 4,386,771 | 6/1983 | Lakdawala | 271/82 |
| 4,390,176 | 6/1983 | Kato | 271/270 |
| 4,634,113 | 1/1987 | Matsuda | 271/259 |
| 4,664,032 | 5/1987 | Abendroth et al. | 101/230 |
| 4,699,368 | 10/1987 | Hiraoka et al. | 271/82 |
| 4,778,290 | 10/1988 | Costa et al. | 400/208 |
| 4,807,867 | 2/1989 | Lippold et al. | 271/277 |
| 4,824,096 | 4/1989 | Fichter et al. | 271/277 |
| 4,833,989 | 5/1989 | Wieland | 101/410 |
| 4,838,537 | 6/1989 | Matsuda et al. | 271/277 |
| 4,843,433 | 6/1989 | Minami et al. | 355/49 |
| 4,848,230 | 7/1989 | Haupenthal | 101/409 |
| 4,918,463 | 4/1990 | Piatt | 346/134 |

FOREIGN PATENT DOCUMENTS

| | | |
|---|---|---|
| 1167861 | 1/1986 | European Pat. Off. . |
| 1162898 | 9/1969 | United Kingdom . |

OTHER PUBLICATIONS

"Gripper/Ejector Mechanism", Davidge, Simpson & Stroh, IBM Technical Disclosure Bulletin, vol. 20, No. 11B, Apr., 1978, pp. 4702 and 4703.

*Primary Examiner*—Benjamin R. Fuller
*Assistant Examiner*—Gerald E. Preston
*Attorney, Agent, or Firm*—Raymond L. Owens

[57] ABSTRACT

A printer uses a rotating platen to transport a sheet of receiver (print media) across a programmable print head. The receiver is held to the platen with a positive receiver-locking clamp at the beginning of a print cycle. The clamp is released prior to the completion of formation of an image on the receiver so that the receiver can be quickly removed from the platen. This reduces the print cycle time of the printer. The clamp is configured and operated such that the speed of the moving receiver is not changed when the clamp is released. The clamp configuration and operation thereof permit the printing of high-resolution images without any discernible image distortions being caused by the release of the clamp during image formation.

15 Claims, 6 Drawing Sheets

METHOD AND APPARATUS FOR PRINTING WITH A REDUCED PRINT-CYCLE TIME

CROSS REFERENCE TO RELATED PATENT APPLICATIONS

The present invention is related to a co-pending U.S. patent application Ser. No. 07/663,991 entitled "Apparatus For Clamping And Ejecting A Receiver In A Printing Operation", which has common inventorship, a common assignee, and is being filed concurrently with the present patent application.

FIELD OF THE INVENTION

This invention relates generally to printing operations, and in particular to printing operations in which receivers (printing media) are clamped and transported on rotating platens.

BACKGROUND OF THE INVENTION

Electronic and software techniques associated with computer generated imagery are continuously evolving to provide increased resolution and greater clarity. The electronic and software improvements have at times outstripped the mechanical capabilities of recording devices and recording media to print this improved resolution and clarity. This situation presently exists in some applications in the field of thermal printing.

Many electronic and software techniques are used with thermal printers to control the flow cf data to thermal print heads. See for example U.S. Pat. Nos. 4,745.413 (Scott Brownstein et al.) and 4,710,783 (Holden Caine et al.). These techniques create extremely accurate reproductions of successive lines of an image on a recording medium receiver. But, the creation of extremely accurate successive lines of an image does not necessarily create a complete image of equivalent clarity if the receiver is not transported across a print head with the same degree of accuracy.

A failure to achieve accurate spacing between successive lines of an image during its formation results in distortions of the image. For example, discrete horizontal stripes may appear in images that should otherwise have continuous tones. Some of these anomalies are acceptable in certain low resolution images having less than 150 lines per inch. In this low resolution range the presence of the discrete horizontal stripes is not easily discernible. However, when thermal printers are used to create images of higher resolution (e.g., 300 lines per inch), the need to control the distance between lines of the image becomes much more acute because the objectionable distortions become visually discernable.

One field of use for high resolution image recording by thermal printers is scientific applications such as recording outputs of electron microscopes. In these applications still another problem adds to the acuity of line spacing control. The normal format of electron microscope image recording is on relatively small sized paper (e.g., 5 inches×7 inches). This format facilitates the placement of recorded images into convenient record keeping books and the like. In the context of high resolution..thermal printing operations on small sized receivers, it has been found that conventional techniques of loading, transporting and ejecting the receiver introduce variations in the speed of the receiver as it passes the print head. These variations manifest themselves as discernible horizontal stripes in the high resolution images and thus adversely effect the quality of the images.

It is possible to eliminate these deleterious effects of conventional receiver handling techniques by assuring that the printer is not engaged in image formation printer during the performance of any of the receiver handling steps. This is undesirable since it results in a thermally printed image being generated in a longer time than is realized by other recording techniques. Thus a need for a realistic speed of operation exists in high resolution thermal printers. Typically a printer is required to create a full-color image in less than one minute. A minute per print is not easily attainable if some receiver handling steps are not performed concurrently with the formation of an image.

It is desirable therefore to perform high resolution thermal printing with short print-cycle times and without introducing distortions in the printed image.

SUMMARY OF THE INVENTION

The present invention is directed to a system of printing that achieves uniformity of transport speed of a receiver in a thermal printer, while at the same time accomplishing such transport rapidly. The transport of the receiver is performed by a transporting system which is capable of transporting and ejecting the receiver in a thermal printer during formation of an image on the receiver without changing the speed of the receiver. The transport system consists of a cylindrical transport platen with an integral clamping and ejection mechanism.

In a preferred embodiment, the mechanism is operated through an axially oriented control system which operates without disturbing the rotational speed of the platen. The mechanism is uniquely structured to perform an acceleration-free release and ejection of a leading edge of the receiver during formation of an image on the receiver. Release and ejection without essentially any acceleration assures that the speed of the receiver remains constant. This enables high resolution printing to continue through the ejection period and consequently the thermal printer is operable on a desirable short cycle.

Viewed from one aspect the present invention is directed to an apparatus for printing an image on a receiver during rotation of a receiver-supporting cylindrical platen. The apparatus comprises means for clamping a leading edge of the receiver against the platen for a beginning portion of an image formation cycle, and means for releasing the leading edge of the receiver from the platen while the image is still being formed on portions of the receiver behind the leading edge thereof.

Viewed from another aspect the present invention is directed to a method for printing an image on a receiver during rotation of a receiver-supporting cylindrical platen. The method comprises the steps of holding a leading edge of the receiver against the platen for a beginning portion of an image formation cycle, and releasing the leading edge of the receiver from the platen while the image is still being formed on portions of the receiver behind the leading edge thereof.

The invention will be better understood from the following detailed description taken in consideration with the accompanying drawings and claims.

The figures are not necessarily drawn to scale.

DETAILED DESCRIPTION

Figure 1:
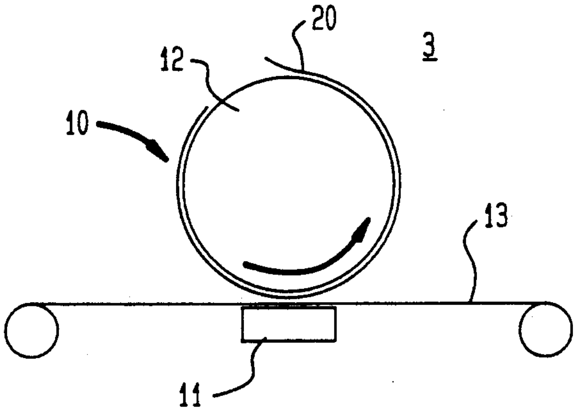
FIG. 1 schematically shows a cross-sectional view of a printing apparatus in accordance with the present invention.

Referring now to FIG. 1, there is shown schematically a ting apparatus 3 (hereinafter referred to as printer 3) in accordance with the present invention. The printer 3 comprises a print head 11, a cylindrical platen 12 and a dye donor film transport device 13. In operation, successive sheets of recording-media receivers 20 are placed on the rotation of the platen 12. An image is formed on the receiver 20 in a series of successive lines formed when the print head 11 responds to various image-forming signals transmitted to the print head from a computer-driven image source (not shown).

Figure 2:
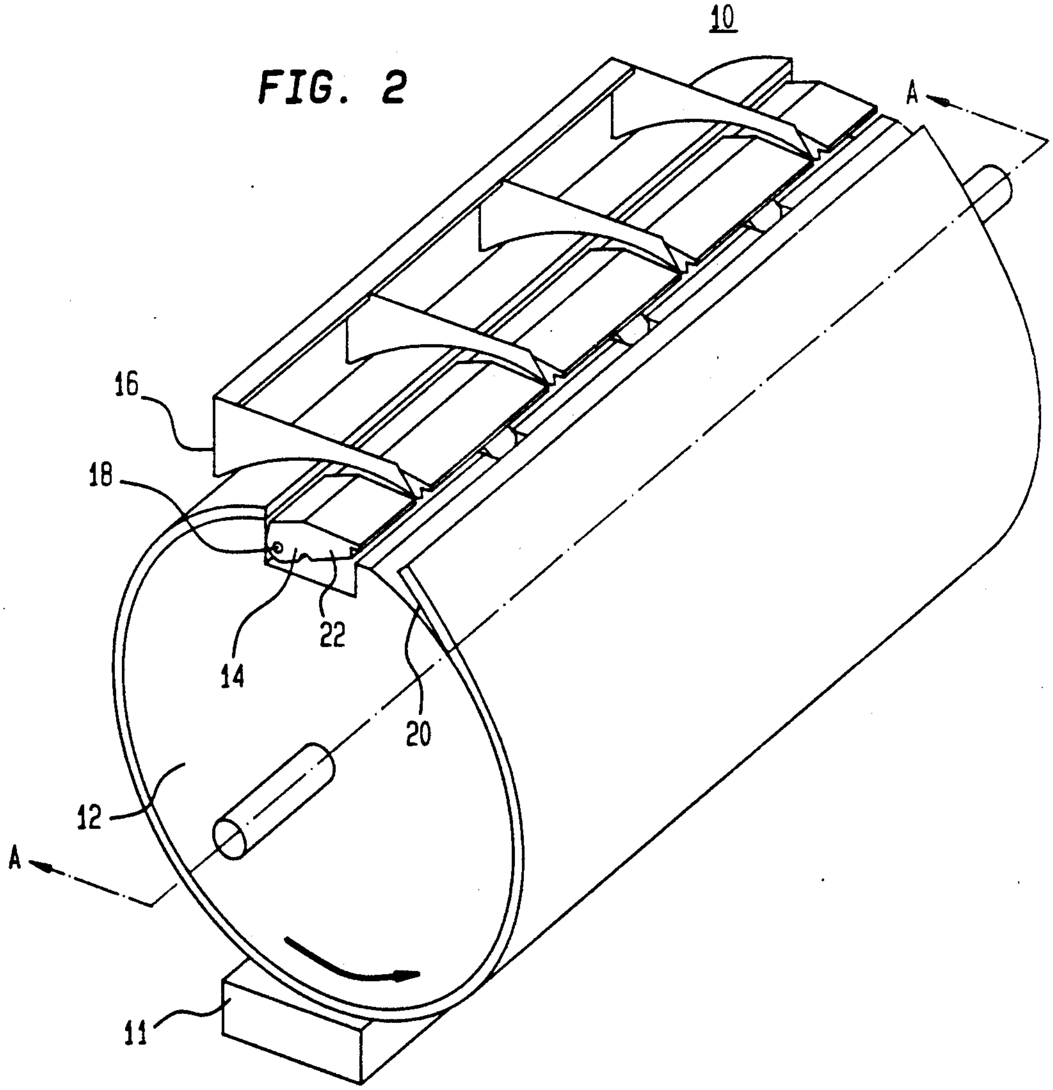
FIG. 2 shows an overall perspective view of a portion of a receiver transporting apparatus which is useful as part of the apparatus of FIG. 1.

Referring now to FIG. 2, there is shown a perspective view of a receiver transporting apparatus 10. The receiver transporting apparatus 10 is a preferred embodiment of portions the printer 3 of FIG. 1 and reference numbers of common element are the same. The receiver transporting apparatus 10 comprises the cylindrical platen 12, a clamp 14 and a stripper bar 16. The clamp 14 is secured to the platen 12 along a pivot axis 18 and is adapted to engage and disengage with the receiver 20 when pivoted about the axis 18.

The receiver transporting apparatus 10, hereinafter referred to as a receiver transport 10, can be utilized in many types of printers, but it is particularly useful in small thermal printers (e.g., printers capable of producing images on five inch by seven inch receivers). The operation of the receiver transport 10 is therefore described in the context of its operation within a small full-color thermal printer such as the printer 3 schematically illustrated in FIG. 1.

The receiver transport 10, which is disclosed herein, is disclosed and claimed in the co-pending U.S. Patent Application which is cited in the Cross Reference to Related Patent Applications section hereinabove.

In a typical print cycle, the receiver 20 is moved to a point where a leading edge of the receiver 20 is secured to the platen 12 with the clamp 14. After the receiver 20 is secured to the platen 12, the platen is rotated in a clockwise direction one and one half revolutions while a first primary-color image is formed on the receiver 20. After the first primary-color image has been formed, the rotation of the platen 12 continues and a second primary-color image overlying the first image is formed on the receiver 20. The second image formation occurs while the platen 12 is rotated one additional revolution. The process is repeated one more time for a third primary-color image. However, while the platen 12 is rotating during the forming of the third image, the clamp 14 is released from the receiver 20 when the leading edge of the receiver 20 becomes aligned with the stripper bar 16. The leading edge of the receiver 20 is thus ejected from the platen 12 while formation of the third image is still taking place on other portions of the receiver 20.

Because the receiver 20 is being progressively ejected from the platen 12 during the formation of the third image, there is no need to drive the platen 12 through an additional revolution of travel prior to ejection of the receiver. Thus the overall printing cycle for a three stage printing operation is held to three and one half revolutions of the platen 12. This is to be compared with four and one half revolutions that are required if the receiver 20 is not released during the formation of the third image. This present inventive technique produces an effective reduction of more than 25% in print cycle time as compared to prior apparatus in which the receiver is not released during image formation.

Because image formation occurs while the clamp 14 is being released, it is imperative that the actuation of the clamp 14 be accomplished without disturbing the rotational speed of the platen 12 or the surface speed of the receiver 20. The details of the actuation of the clamp 14 can be understood by referring to FIGS. 3 through 6.

Figure 3:
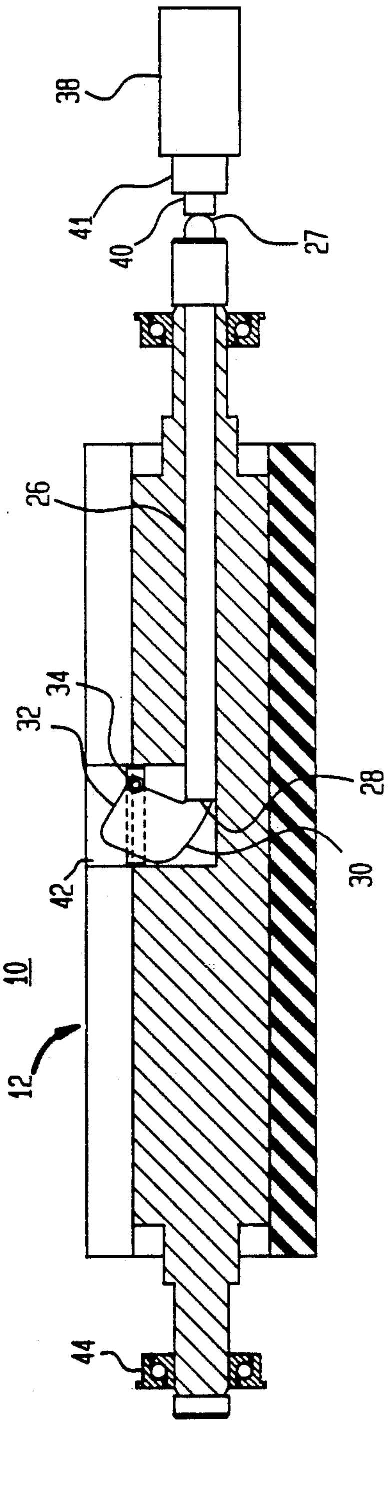
FIG. 3 shows a cross-sectional view of a portion of the receiver transporting apparatus of FIG. 2, in a first position of operation, taken along a dashed line A—A with additional elements of the receiver transporting apparatus being shown.
Figure 5:
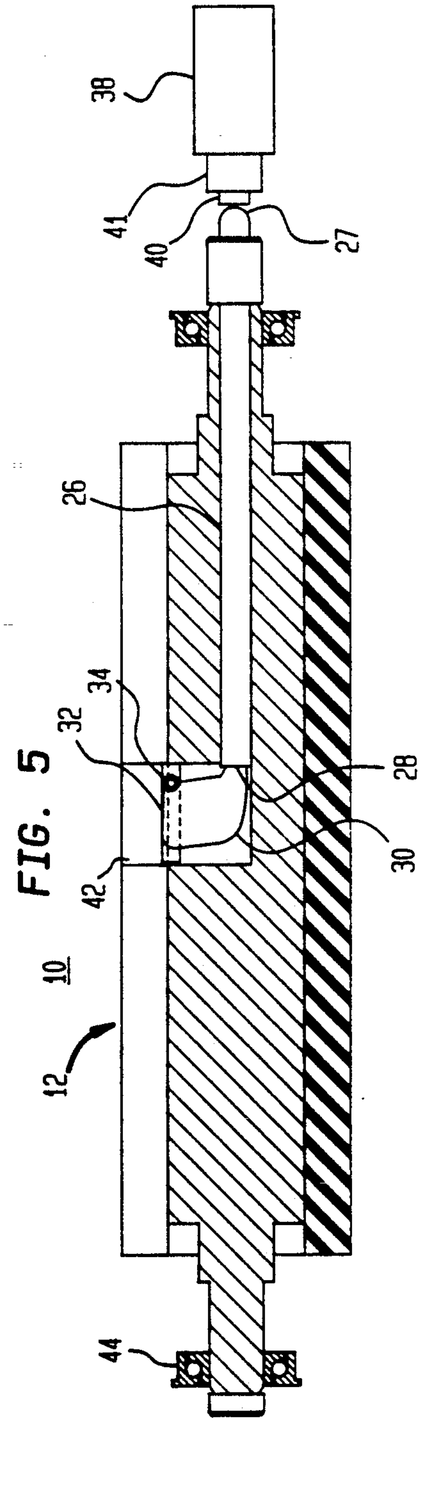
FIG. 5 shows a second cross-sectional view cf a portion the receiver transporting apparatus of FIG. 2, in a second position of operation, taken along the dashed line A—A with additional elements of the receiver transporting apparatus being shown.

Referring now to FIGS. 3 and 5, there are shown cross-sectional views of portions of the receiver transport 10. Some elements which are not shown in FIG. 2 are shown in FIGS. 3 and 5 and some of the elements shown in FIG. 2 are not shown in FIGS. 3 and 5. In particular, the additional elements shown in FIGS. 3 and 5 comprise an actuating shaft 26 having an outer end 27 and an inner end 28, a lifting lever 30 (also denoted as operating member) having a clamp-engaging surface 32 and a pivot axis 34, a solenoid 38 having a plunger 40 and a pneumatic damper 41, an operating slot 42 formed in the platen 12, and platen-support bearings 44. The platen 12 also supports the clamp 14, but in FIGS. 3 and 5 the clamp 14 is removed for purposes of clarity. FIGS. 3 and 5 differ from one another by illustrating the lifting lever 30 in differing positions.

The actuating shaft 26 is adapted to move axially within the platen 12. The actuating shaft 26, at its inner end 28, is pressed against the lifting lever 30. The lifting lever 30 is adapted to pivot on the axis 34 within the slot 42 formed in the platen 14. The actuating shaft 26 is driven inwardly toward the lifting lever 30 by the solenoid 38. The plunger 40 of the solenoid 38 contacts the actuating shaft 26 to push the shaft 26 inwardly. At all other times during the operation of the receiver transport 10, the plunger 40 and the actuating shaft 26 are disengaged. In another embodiment of the invention (not shown), the actuating shaft 26 is moved by a cam driven by a conventional gear-motor drive system. In the context of the present invention, the elements of the apparatus which apply operational force to the actuating shaft 26 are denoted as actuating means.

Figure 4:
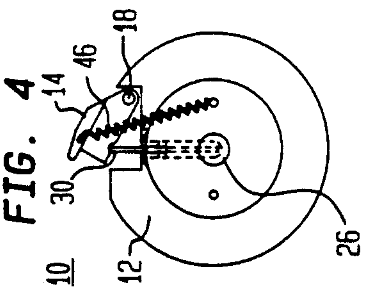
FIG. 4 shows an end view of the portion of the receiver transporting apparatus shown in FIG. 3.
Figure 6:
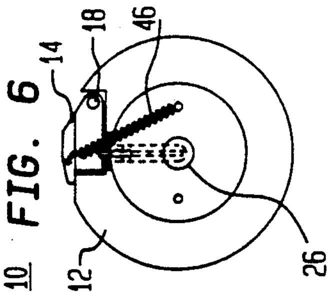
FIG. 6 shows an end view of the portion of the receiver transporting apparatus shown in FIG. 5.

Referring now to FIGS. 4 and 6, there are shown end views of the printer transport 10 of FIGS. 3 and 5, respectively, showing an extension spring 46 (deleted from FIGS. 3 and 5 for clarity), the platen 12, the clamp 14, and the lifting lever 30. The solenoid 38 of FIGS. 3 and 5 is removed for purposes of clarity.

Referring now to FIGS. 3 through 6, there is shown the operation of the clamp 14. FIGS. 3 and 4 show the operation of the lifting lever 30 as it functions to release the clamp 14. It can be seen, by comparing FIGS. 3 and 4 with FIGS. 5 and 6, that axial movement of the actuating shaft 26 is translated into radial movement of the clamp-engaging surface 32 of the lifting lever 30. When the clamp-engaging surface 32 is at the position shown in FIG. 3, the clamp 14 is in an open position as shown in FIG. 4. When the clamp-engaging surface 32 is at the position shown in FIG. 5, the clamp 14 is in a closed position as shown in FIG. 6. The clamp 14 moves to its closed position through force created by the extension springs 46 which pull the clamp inwardly toward the platen 14.

The elements shown in FIGS. 3 through 6 for operating the clamp 14 are designed to operate in a way that introduces no discernible variations of rotational speed of the platen 12. Accordingly, no visually discernible (i.e., visible to an unaided human eye) distortions are generated on an image formed on the receiver 20 during the operation of the clamp 14. There are three design features which contribute to achieving this non-disturbing mode of operation.

First, the actuating shaft 26, at its outer end 27, is formed with a spherical shape. The spherically shaped end 27 is driven axially by a flat surface formed on the plunger 40 of the solenoid 38. The contact area between the actuating shaft 26 and the solenoid plunger 40 is thus reduced to a single point. In other words, the contact area has effectively a zero diameter. This configuration results in virtually no torque being transmitted across the interface formed by the actuating shaft 26 and the solenoid plunger 40. Thus the operation of the solenoid 38 occurs without introducing essentially any speed change in the rotating platen 12.

Second, the platen-support bearings 44 are combination thrust and radial ball-bearings which are designed to absorb, with very little friction, thrust forces created when the actuating shaft 26 is moved axially by the plunger 40. Because of the use of these low-thrust friction bearings 44, the platen 12 continues to rotate with essentially no change in torque when the actuating shaft 26 is moved axially by the plunger 40.

Third, the plunger 40, while driven by a conventional fast-acting solenoid, has its velocity controlled by the pneumatic damper 41 incorporated onto the solenoid 38. The damper 41 assures that the actuating shaft 26 is moved with very low acceleration. Thus there are essentially no vibrations transmitted to the receiver 20 when the solenoid 38 operates.

The clamp 14 operates in a very smooth and non-disturbing manner as a result of spherical shaping of the actuating shaft end 27, the use of low-thrust friction bearings 44, and the use of the pneumatic damper 41. Even in the context of a very compact thermal printer used to make images on five by seven inch receivers, the clamp 14 operates during a print cycle with essentially no discernible change in rotational speed of the platen 12. Thus the clamp 14 can be operated during the formation of an image on the receiver 20 without introducing any distortion which is discernible to an unaided human eye.

The clamp 14, in addition to being operable without any discernible disturbance of the rotational speed of the platen 12, is also provided with a unique configuration that permits it to operate without disturbing the surface speed of the receiver 20. The key to ejecting the receiver 20 from platen 12 without disturbance is in permitting the leading edge of the receiver 20 to follow its natural locus. The principles of this unique configuration can be best understood by referring to FIGS. 7, 8, 9, 9A, 9B and 9C.

Figure 7:
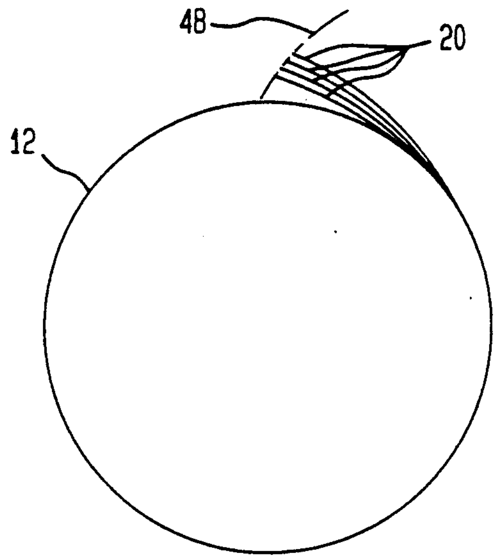
FIG. 7 shows a symbolic representation of a receiver in series of positions ejecting from the receiver transport apparatus shown in FIG. 2.

Referring now to FIG. 7, a series of positions of the receiver 20 are illustrated symbolically as the receiver 20 would progressively move away from the platen 12 if allowed to follow an undisturbed course. The path or locus of the leading edge of the receiver 20 is an involute shown by a broken line 48.

Figure 8:
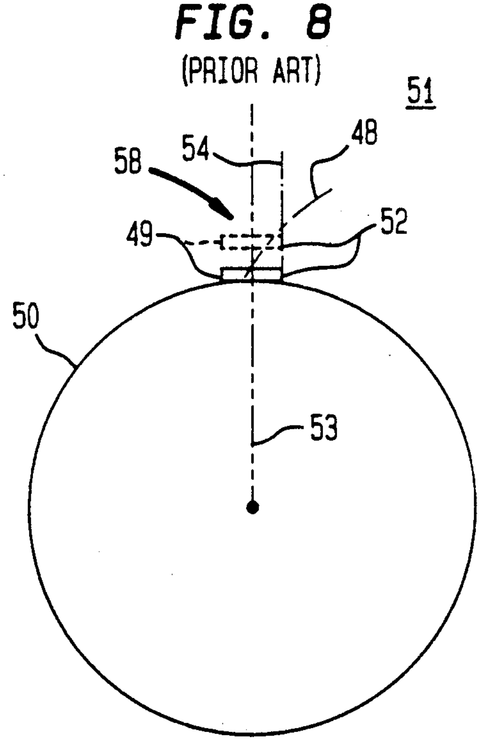
FIG. 8 (PRIOR ART)
FIG. 8 shows a symbolic representation of a prior art receiver transport apparatus.

Referring now to FIG. 8, there is shown a diagram which demonstrates the difficulties encountered in attaining a non-disturbing release of a receiver from a platen when a prior art clamp is used. FIG. 8 shows, symbolically, portions of a prior art receiver transport 51 comprising a holding portion 49 of a prior art clamp 58 which, as is typical of such clamps, is disposed to move radially with respect to a platen 50. The holding portion 49 is shown in two positions. A closed position is shown by a solid line rectangle and a fully open position is shown with a dashed line rectangle. Other portions of the clamp 58 are deleted from FIG. 8, for purposes of clarity, but are shown and discussed later in FIGS. 9A, 9B and 9C.

FIG. 8 also shows two dashed locus lines 48 and 54. The locus line 54 (clamp locus) represents a locus of travel of a receiver-engaging edge 52 of the holding portion 49. The locus line 48 (receiver locus) represents the locus of the leading edge of the receiver 20 shown in FIG. 7. For purposes of clarity, the receiver 20 is not shown in FIG. 8.

Because the prior art clamp moves radially with respect to the platen 50, the clamp locus 54 is a line which is parallel to a radius 53 of the platen 50. As is typical of the prior art clamps, the clamp locus 54 overlaps with the receiver locus 48 in the space between the platen 50 and the fully open holding portion 49 of the prior art clamp. This means that, even when the prior art clamp 58 is fully open, the leading edge of the receiver 20 is not free to follow the receiver locus 48. Thus the receiver 20 is not fully released by the prior art clamp 58 when the clamp is fully open.

Figure 9A:
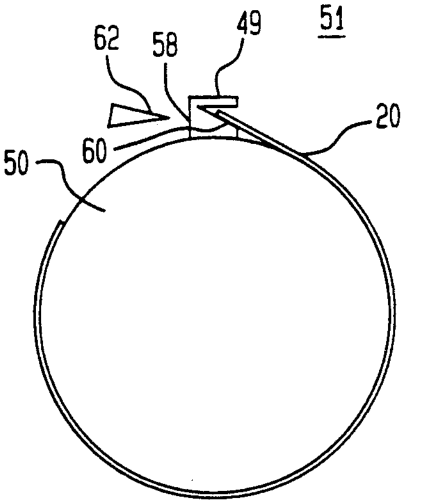
FIG. 9A (PRIOR ART)
FIGS. 9A, 9B, and 9C show a series of progressive illustrations of the operation of a prior art receiver transport apparatus.
Figure 9B:
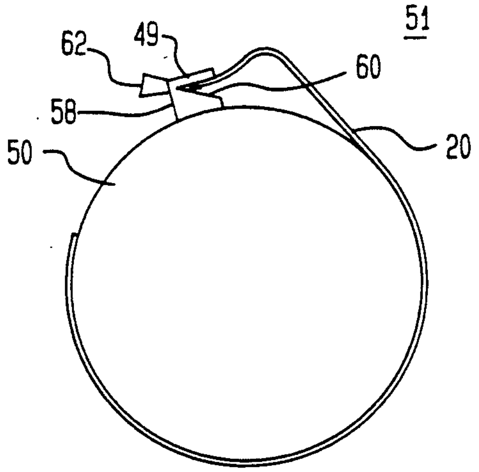
FIG. 9B (PRIOR ART)
Figure 9C:
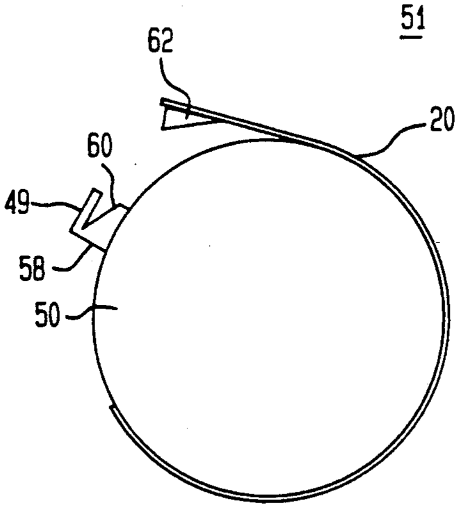
FIG. 9C (PRIOR ART)

Referring now to FIGS. 9A, 9B and 9C, there is illustrated in detail a typical form of disturbance that occurs when the receiver 20 is released and ejected from a prior-art receiver transport 51 that uses a prior art clamp such as the one discussed hereinabove. The receiver transport 51 is shown in more detail in FIGS.

9A, 9B and 9C than in FIG. 8. FIGS. 9A, 9B and 9C illustrate the platen 50, the radially operating prior art clamp 58 on which there is a lifting cam 60, and a stripper bar 62. The clamp 58 is shown in a fully open position. The lifting cam 60 and stripper bar 62 are used to positively eject the receiver 20 from the platen 50.

FIG. 9A shows the position of the receiver 20 when the lifting cam 60 begins the ejection of the receiver 20. It can be seen (as explained in FIG. 8) that the receiver engaging portion 49 of the prior art clamp 58 is in position to restrain outward movement of the leading edge of the receiver 20 even though the lifting cam 60 is operating to eject the receiver from the platen 50.

FIG. 9B shows the platen 50 in a rotated position in which the stripper bar 62 is engaged with the leading edge of the receiver 20. In this position the leading edge of the receiver 20 is still constrained by the prior art clamp 58 from moving outwardly of the platen 50. As a consequence of the constraint, the receiver 20 is buckled backwardly by the stripper bar 62.

FIG. 9C shows the platen 50 in a position in which the leading edge of the receiver 20 is free of the previously constraining prior art clamp 58. It can be seen, by comparing FIGS. 9B and 9C, that the receiver 20 is subjected to a rapid distortion during ejection from the platen 50. This distortion manifests itself in a disruption of the surface speed of the receiver 20. If an image were being formed on the receiver 20 during this ejection, an undesirable distortion of the image would occur.

Figure 10:
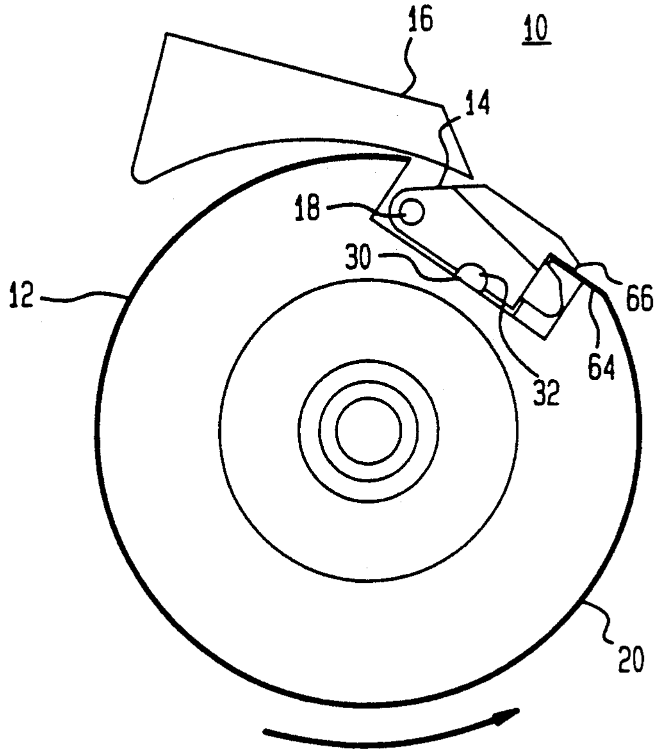
FIG. 10 shows an end view of a preferred embodiment of portion of the present invention showing the clamp of FIG. 2 positioned on the receiver transport apparatus of FIG. 2.

Referring now to FIG. 10, there is illustrated a partial end view of the receiver transport 10 of FIG. 2. In particular, there is illustrated, in detail, a configuration of the clamp 14. In FIG. 10, the clamp 14 is illustrated in a closed position holding the leading edge of the receiver 20 against the platen 12. The platen 12, while generally cylindrical in shape, has a flat surface 64 formed inwardly of its outer circumferential surface. The clamp 14 engages and holds the receiver 20 against the flap surface 64. Additionally, the pivot axis 18 of the clamp 14 is displaced circumferentially from the clamp-engaging surface 32 of the lifting lever 30. Radial movement of the clamp-engaging surface 32, as shown in FIGS. 3 and 6, results in a rotational movement of the clamp 14.

Figure 11:
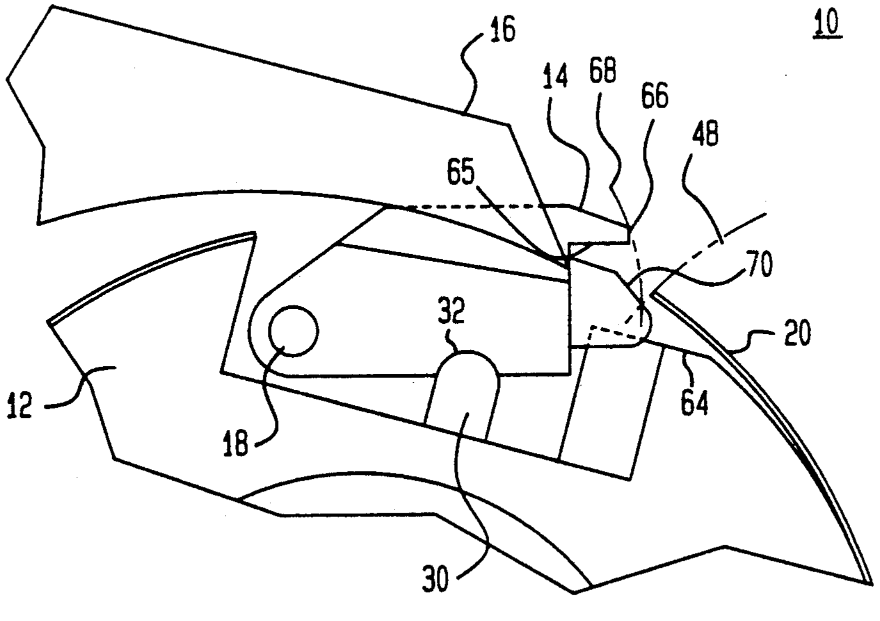
FIG. 11 shows a portion of the receiver transport apparatus of FIG. 10 illustrating the receiver clamp of FIG. 10 in an open position.

Referring now to FIG. 11, there is shown an enlarged portion of the receiver transport 10 of FIG. 10 with the clamp 14 in a fully open position. In particular, FIG. 11 illustrates an arcuate path or locus of travel of an extremity 66 of a receiver-engaging surface 65 of the clamp 14 as the clamp rotates about the pivot axis 18. This clamp locus is designated by a broken line 68. Also shown on FIG. 11 is the natural locus 48 of the leading edge of the receiver 20 (shown in FIG. 7). It can be seen that the two loci intersect before the clamp 14 has reached its fully open position. In other words, the leading edge of the receiver 20 is completely free from the receiver-engaging surface 65 before being ejected from the platen 12. Thus the receiver speed distortions created by the prior art clamp 58 is shown in FIGS. 9A, 9B and 9C are eliminated.

Also shown in FIG. 11 is a lifting cam 70 formed as a portion of the clamp 14. The lifting cam 70 ejects the leading edge of the receiver 20 from the platen 12 as the cam 70 rotates with the clamp 14.

Figure 12:
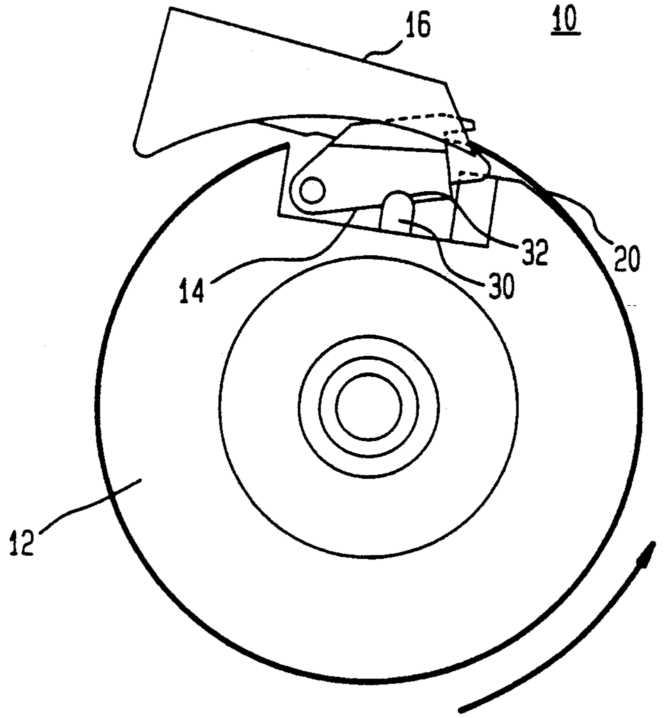
FIG. 12 shows the receiver clamp of FIG. 10 illustrating an operational feature of the clamp.

Referring now to FIG. 12, the receiver transport 10 of FIG. 10 is shown with the platen 12 rotated to a point at which the leading edge of the receiver 20 is just beginning to contact the stripper bar 16. The clamp 14 does not constrain the receiver 20 at this point.

Figure 13:
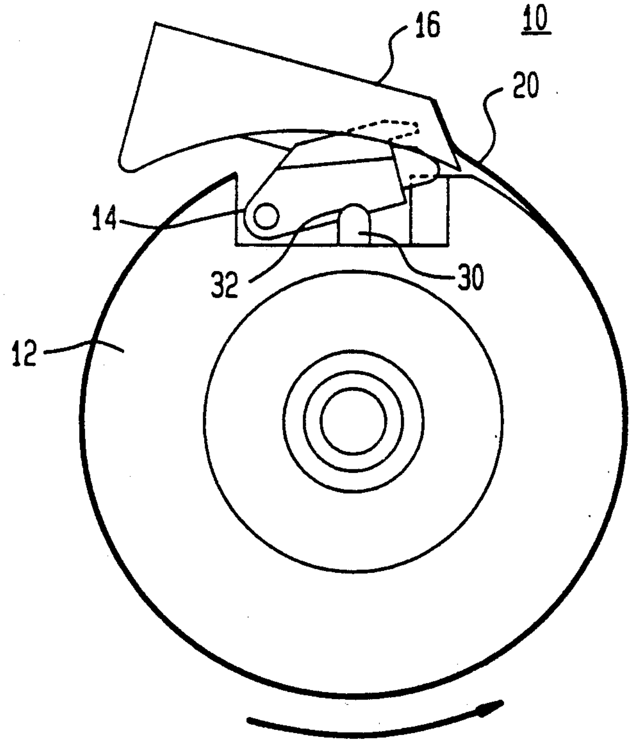
FIG. 13 shows the clamp of FIG. 10 illustrating another operational feature of the clamp.

Referring now to FIG. 13, the receiver transport 10 of FIG. 12 is shown with the platen 12 rotated further. It can be seen that the leading edge of the receiver 20 glides freely onto the stripper bar 16 as the rotation of the platen 12 continues. No undesirable accelerations of any portions of the receiver 20 occur during the ejection. The receiver 20 may therefore be released during image formation without the generation of undesirable image distortions.

It is to be understood that the specific design described as an exemplary embodiment is merely illustrative of the spirit and scope of the invention. Modifications can be made in the specific design consistent with the principles of the invention. For example, although the invention has been described in terms of its primary applicability to full-color thermal printing, it has application to laser printing or to any forms of printing where precise control of the surface speed of a receiver and reduced print-cycle times are critical factors of operation.

What is claimed is:

1. Apparatus for printing an image on a receiver during rotation of a receiver-supporting cylindrical platen comprising:

means for clamping a leading edge of the receiver against the platen for a beginning portion of an image formation cycle; and means for releasing the leading edge of the receiver from the platen while the image is still being formed on portions of the receiver behind the leading edge thereof.

2. The apparatus of claim 1 wherein the releasing means is adapted to operate without introducing substantially any variation of speed of the receiver during said release so that the image generated on the receiver has no visually discernable distortion.

3. The apparatus of claim 1 further comprising means for ejecting the receiver from the platen, wherein said means for ejecting comprises a stationary stripper bar which is positioned near the surface of the platen and which is adapted to engage the leading edge of the receiver when the leading edge is released.

4. The apparatus of claim 3 wherein the means for clamping comprises a clamp having a receiver-engaging surface, said clamp being adapted, upon release, to completely remove the receiver-engaging surface from a natural locus of travel of the leading edge of the receiver before the stripper bar engages the leading edge so that the leading edge of the receiver glides freely onto the stripper bar with substantially no accelerations caused by either the clamp or the stripper bar.

5. The apparatus of claim 4 wherein:

the clamp is driven in operation by an operating member that moves radially with respect to the platen; and the clamp is adapted to rotate about a pivot point that is displaced circumferentially, on the platen, from a point at which the operating member connects with the clamp such that the receiver-engaging surface of the clamp follows an arcuate path when the clamp is released.

6. The apparatus of claim 4 wherein the receiver-engaging surface of the clamp is disposed to release the receiver at a point reached before the clamp reaches fully open position.

7. The apparatus of claim 4 wherein the clamp is operable through a mechanism that comprises:

an actuating shaft adapted to move along an axis of rotation of the platen, said actuating shaft having a spherically shaped end and being adapted to release the clamp in response to said axial movement; and actuating means, remote from the platen, for moving the actuating shaft axially, the actuating means having a flat surface adapted to contact and press against the spherically shaped end of the actuating shaft during axial movement of the shaft.

8. The apparatus of claim 4 wherein the cylindrical platen is supported by bearings which are adapted to sustain axial and radial loading while rotating in a substantially friction-free manner.

9. The apparatus of claim 4 wherein the actuating shaft is moved axially by a solenoid that is provided with a damping device adapted to control axial acceleration of the actuating shaft.

10. The apparatus of claim 4 wherein:

the clamp is operable through a mechanism that comprises an actuating shaft adapted to move along an axis of rotation of the platen;

the actuating shaft having a spherically shaped end and being adapted to release the clamp in response to said axial movement;

the cylindrical platen is supported by bearings which are adapted to sustain axial and radial loading while rotating in a substantially friction-free manner;

actuating means, remote from the platen, for moving the actuating shaft axially;

the actuating means having a flat surface adapted to contact and press against the spherically shaped end of the actuating shaft during axial movement of the shaft; and the actuating means having a damping device adapted to control axial acceleration of the actuating shaft.

11. A method for printing an image on a receiver during rotation of a receiver-supporting cylindrical platen comprising the steps of:

holding a leading edge of the receiver against the platen for a beginning portion of an image formation cycle; and releasing the leading edge of the receiver from the platen while the image is still being formed on portions of the receiver behind the leading edge thereof.

12. The method of claim 11 wherein the releasing step is performed without introducing any substantial variation of speed of the receiver during said release such that visually discernible image distortions are not generated by the release.

13. The method of claim 11 wherein:

the holding step is performed with a clamp mounted on the platen;

the releasing step occurs when the leading edge of the receiver is adjacent a stationary stripper bar positioned near the surface of the platen; and the clamp is released in a manner to be completely removed from a natural locus of travel of the leading edge of the receiver when the stripper bar engages the leading edge so that the leading edge of the receiver glides freely onto the stripper bar without any accelerations caused by either the clamp or the stripper bar.

14. The method of claim 13 wherein the releasing step comprises rotating the clamp about a pivot point that is displaced circumferentially on the platen from a point at which the clamp engages the leading edge of the receiver so that a receiver-engaging surface of the clamp follows an arcuate path.

15. The method of claim 13 wherein the holding step is performed by causing the receiver-engaging surface of the clamp to release the receiver prior to a time when the clamp is fully open.

* * * * *